Figure 1:
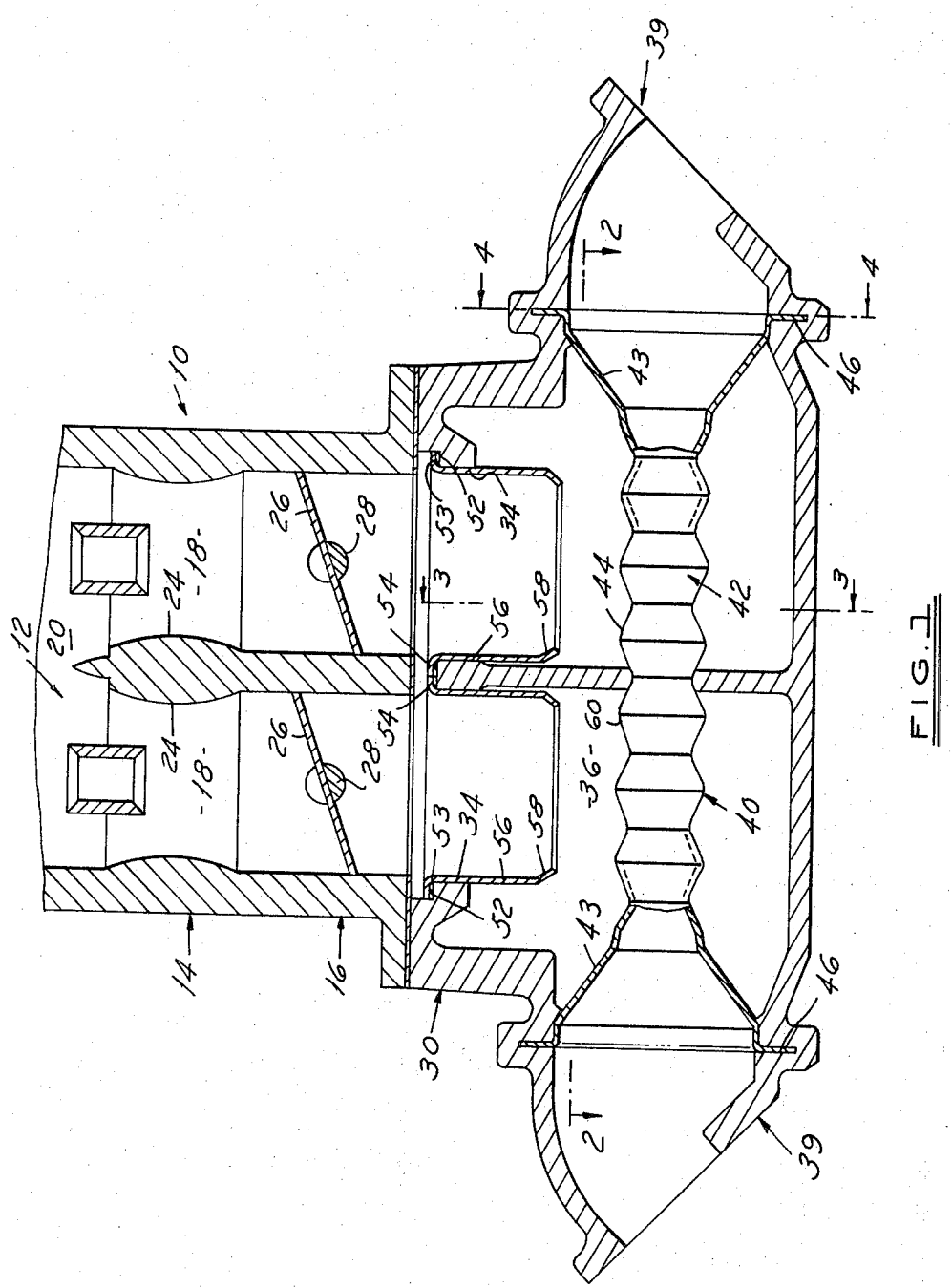

United States Patent [19]
Chester et al.

[11] 3,872,849
[45] Mar. 25, 1975

[54] ENGINE FUEL VAPORIZER

[75] Inventors: Frederic J. Chester, Oxford; Richard P. Krygowski, Livonia, both of Mich.

[73] Assignee: Ford Motor Company, Dearborn, Mich.

[22] Filed: Mar. 7, 1973

[21] Appl. No.: 338,796

[52] U.S. Cl............ 123/122 AA, 123/122 AC
[51] Int. Cl............................. F02m 31/00
[58] Field of Search.. 123/122 AB, 122 AH, 122 AC, 123/141, 122 B, 52 MW

[56] References Cited
UNITED STATES PATENTS

| | | | |
|---|---|---|---|
| 1,128,998 | 2/1915 | Mulvaney | 123/122 AA |
| 1,200,608 | 10/1916 | Hall | 123/52 MV |
| 1,373,290 | 3/1921 | Berruet | 123/122 AA |
| 1,526,963 | 2/1925 | Chandler | 123/141 |
| 1,777,472 | 10/1930 | Mock | 123/122 AB |
| 3,310,045 | 3/1967 | Bartholomew | 123/52 MV |
| 3,648,674 | 3/1972 | Proctor | 123/141 |

FOREIGN PATENTS OR APPLICATIONS

| | | | |
|---|---|---|---|
| 870,460 | 3/1942 | France | 123/122 AA |
| 1,190,803 | 5/1970 | United Kingdom | 123/141 |

*Primary Examiner*—Charles J. Myhre
*Assistant Examiner*—R. H. Lazarus
*Attorney, Agent, or Firm*—Keith L. Zerschling; Robert E. McCollum

[57] ABSTRACT

An engine exhaust gas crossover passage located in the intake manifold directly beneath the carburetor throttle riser bores is defined by a thin sheet metal tube that quickly radiates and transfers its heat to liquid fuel and fuel droplets in the carburetor air/fuel mixture splashed against it, the riser bores having guide members to direct the fuel against the tube, the tube quickly dissipating the heat upon engine shutdown so as not to add to the conventional engine hot soak.

6 Claims, 6 Drawing Figures

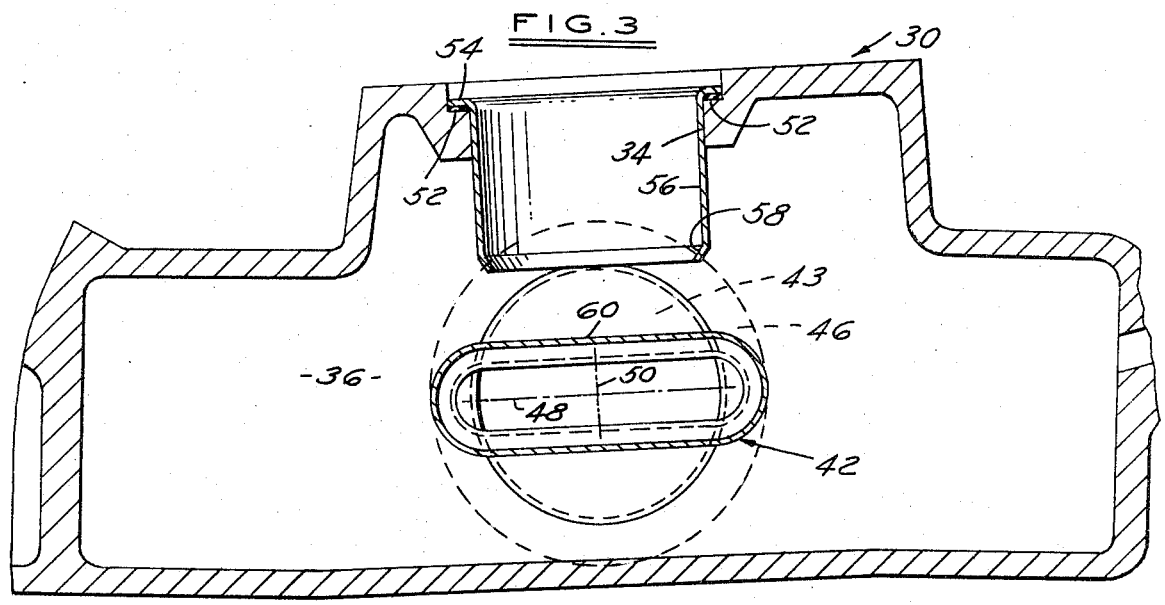
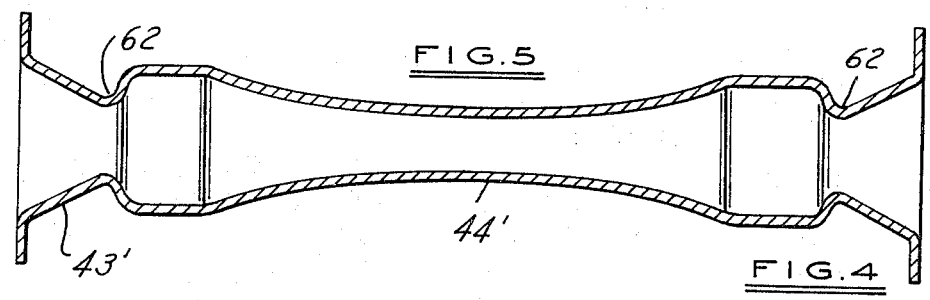
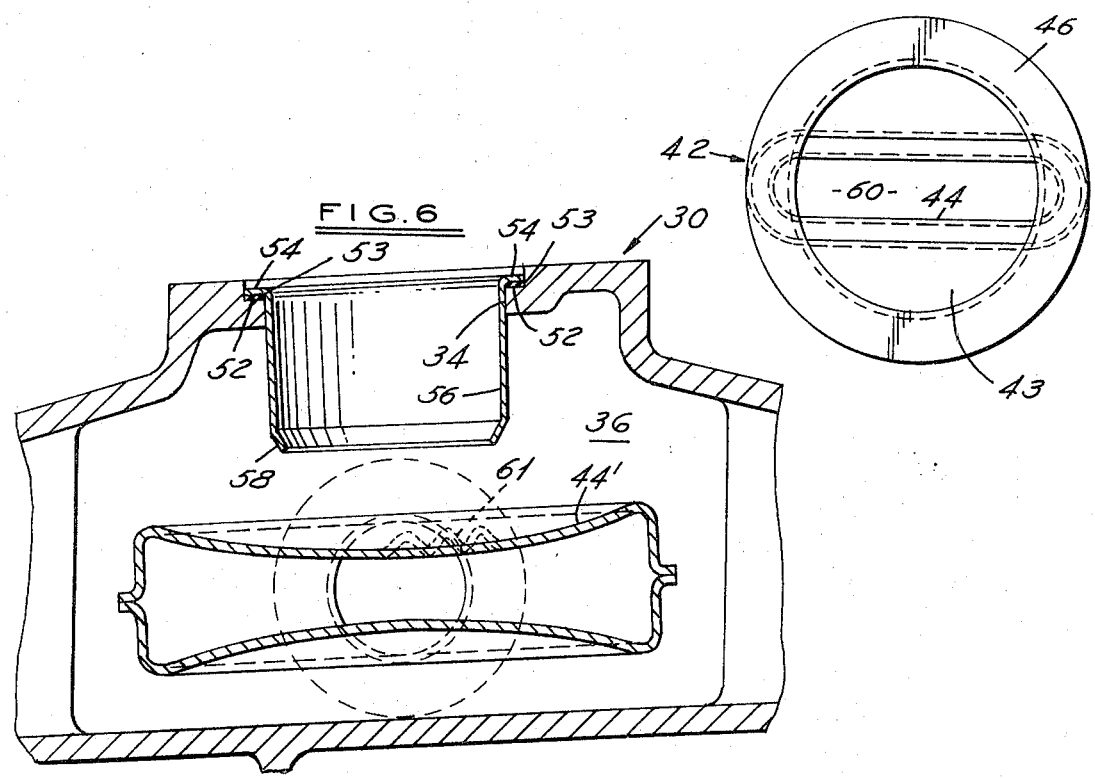

ENGINE FUEL VAPORIZER

This invention relates in general to an internal combustion engine fuel vaporizer. More particularly, it relates to the construction of an exhaust gas crossover passage located in the intake manifold.

Engine constructions are known in which hot exhaust gases at times pass through the intake manifold or along the bottom wall of the intake manifold directly beneath the carburetor throttle riser bores. This provides a so-called hot spot there to vaporize any liquid fuel that may be running down the bore walls as well as fuel droplets that may be present in the carburetor air/fuel mixture to provide more efficient cold engine starts and also to minimize the choking requirements of the engine.

In the past, these constructions generally have consisted of, in a V-8 engine, for example, a casting connecting two exhaust ports on opposite sides of the engine with a passage that passed the hot exhaust gases directly beneath the floor of the intake manifold under the carburetor throttle riser bores. See, for example, item 21 in FIG. 2 of Porter, U.S. Pat. No. 1,998,636.

However, since the floor of the intake manifold, like the rest of the engine, generally was of high thermal inertia cast iron, this resulted in only the slow transmittal or radiation of heat from the exhaust gases to the upper surface of the intake manifold wall or floor. That is, because of the high thermal inertia properties of the cast iron, it was necessary to heat essentially the entire length of the lower wall of the intake manifold and not just the hot spot area before the upper surface which the fuel contacted was hot enough to vaporize the fuel.

This, of course, resulted in the engine operating under rich mixture choking conditions for a longer period than is desirable for both engine operating efficiency and good emission control.

Accordingly, it is a primary object of the invention to provide an engine fuel vaporizer that will quickly provide the heat necessary to rapidly vaporize liquid fuel in the carbureted fuel/air mixture inducted through the intake manifold to the engine cylinders.

It is another object of the invention to provide an internal combustion engine with a thin sheet metal, high heat transfer exhaust gas crossover tube passing directly beneath the carburetor induction passage for quickly radiating and transferring the exhaust gas heat to the incoming air/fuel mixture so that the fuel is quickly vaporized.

A still further object of the invention is to provide an engine construction of the type described above including thin sheet metal liners extending into the intake manifold and having portions directing liquid fuel away from the walls towards the center of the passages to splash against a heat conducting exhaust gas conveying tube located directly beneath the carburetor induction passages.

Figure 2:
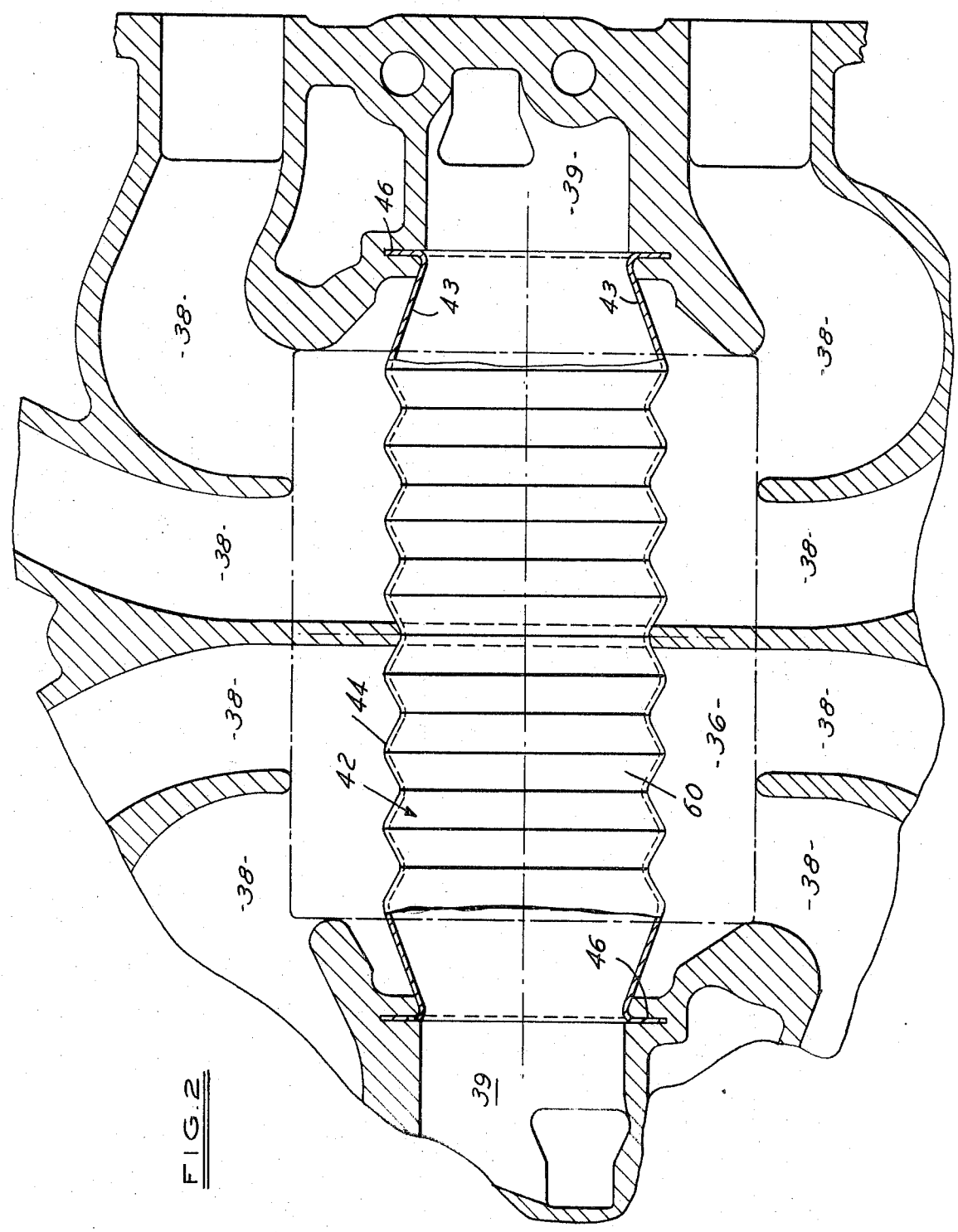

Other objects, features and advantages of the invention will become more apparent upon reference to the succeeding detailed description thereof, and to the drawings illustrating the preferred embodiments thereof; wherein, FIG. 1 is a cross-sectional view of a portion of an internal combustion engine with attached carburetor embodying the invention;

FIGS. 2, 3 and 4 are cross-sectional views taken on planes indicated by and viewed in the direction of the arrows 2—2, 3—3, and 4—4, respectively, of FIG. 1; and, FIGS. 5 and 6 are cross-sectional views of modifications of details shown in FIGS. 1 and 3, respectively.

FIG. 1 illustrates a portion 10 of one-half of a carburetor of a known downdraft type. It has an air horn section 12, a main body portion 14, and a throttle body 16. It has the usual air/fuel induction passages 18 open at their upper ends 20 to fresh air from the conventional air cleaner, not shown. The passages 18 have fixed area venturiis 22 cooperating with booster venturiis 24 through which the main supply of fuel is inducted, by means not shown.

Flow of air and fuel through induction passages 18 is controlled by a pair of throttle valve plates 26 each fixed on a shaft 28 rotatably mounted in the side walls of the carburetor body.

Throttle body 16 is flanged as indicated for bolting to the top of the engine intake manifold 30, which is cast iron. Manifold 30 consists of a hollow chamber with two vertical risers or bores 34 in its upper surface that are aligned for cooperation with the discharge end of the carburetor induction passages 18.

The risers 34 direct liquid fuel and the carbureted fuel/air mixture directly down into the intake manifold chamber 36. The lower portion of the intake manifold, as best seen in FIG. 2, is connected to eight, four on a side, runners 38 leading to the individual engine cylinders. It will be seen, therefore, that the fuel/air mixture is turned 90° from its vertical direction to pass out opposite sides of the manifold to the banks of cylinders on opposite sides of the engine block.

The exhaust manifolding part of the engine cylinder head is indicated partially at 39, and includes an exhaust gas crossover passage 40. The hot exhaust gases pass between the exhaust manifolds, not shown, on each side of the engine through the intake manifold chamber 36 directly beneath the riser bores 34 to vaporize the air/fuel mixture.

More specifically, passage 40 is defined by a thin sheet metal, high heat transfer tube 42. The tube has conical or bell mouth shaped end sections 43 joined to a flattened midportion 44. The end sections 43 each have an annular mounting flange 46 (see FIG. 3) which in this case is cast in place in the cast iron manifold. The end annulus mates with the opening of the manifold. The end sections 43 converge towards midportion 44, which is corrugated in the longitudinal direction.

The flattened midportion 44 has a generally rectangular cross section, as seen in FIG. 3, with major and minor axes 48 and 50. The major axis extends laterally to a width essentially equal to the diameter of the riser bores 34, for a purpose that will become clear later. The upper surface of manifold 30 is recessed adjacent each bore 34 to provide annular shoulders 52. Seated against the shoulder in each bore on a sealing ring 53 is the flanged lip 54 of a thin sheet metal tube or liner 56. The latter extends downwardly into the manifold to a point adjacent tube 42 for guiding the fuel/air mixture and liquid fuel into the manifold against tube 42.

The lower portion of each liner or guide 56 is formed with a conical lip 58 that directs any liquid fuel running down the walls of the liner 56 towards the middle of the liner and into the air/fuel mixture stream. The liquid fuel splashes against tube 42 and also passes around the tube with the air/fuel mixture into the dead air space below the tube to absorb the heat of the tube and pass into the manifold trunks or runners 38 at right angles.

It will be seen, therefore, that the hot exhaust gases will rapidly radiate their heat to the outer surfaces 60 of tube 42; that the flattened corrugated midportion of the tube provides a heat transfer surface area for the entire width of the air/fuel mixture stream; that both top, bottom and side surfaces of tube 42 provide heat; and that, therefore, the liquid fuel particles will be quickly vaporized because of a maximum rate of heat transfer between the exhaust gas the the intake charge. The necessity for a conventional choke fuel enrichment system, therefore, is essentially eliminated, with a resultant reduction in the emission of unburned hydrocarbons. The raw fuel flowing against the tube is vaporized and mixed with inlet air to provide the engine with a combustible charge without additional enrichment only seconds after a start.

An added advantage of the sheet metal tube heater over the conventional cast iron plate or lower manifold wall is heat dissipation upon engine shutdown. The conventional cast iron intake manifold with cast iron floor at the hot spot acts as a heat sink during engine shutdown since the heat only slowly dissipates from it. Accordingly, hot engine restart problems may be encountered by too much fuel being vaporized during engine shutdown; that is, the heat previously radiated from the crossover passage to the entire manifold radiates to other parts of the engine and up through the carburetor walls to the fuel bowl. The fuel then vaporizes and can provide too rich a mixture for engine restart.

The thin sheet metal tube 42 of the invention, on the contrary, has no ability to retain heat once the exhaust gas flow is cut off, and excess evaporation of fuel in the carburetor float bowl on engine shutdown, therefore, does not occur.

FIGS. 5 and 6 show modifications of the shape of the crossover tube 42. The midportion 44' of the two piece (FIG. 6) tube is dished both longitudinally and transversely so that liquid fuel splashed against the upper surface will puddle and be retained until vaporized instead of some escaping into the engine cylinders in a liquid state. That is, the tube midportion is shaped to form a dam along its outer edge, with a depressed central portion. Also, the surface can be corrugated, as indicated in dotted lines 61 in FIG. 6, if desired.

Additionally, these figures show the end sections 43' as having pinched annular portions 62. These permit longitudinal thermal expansion and contraction of the tube.

While the invention has been shown and described in its preferred embodiments, it will be clear to those skilled in the arts to which it pertains, that many changes and modifications may be made thereto without departing from the scope of the invention.

We claim:

1. An engine fuel vaporizer for use on an internal combustion engine having an intake manifold, a carburetor mounted on the intake manifold and having one or more air/fuel induction passages aligned so as to discharge an air/fuel mixture into the intake manifold, exhaust manifolding including an exhaust gas crossover passage connecting spaced parts of the exhaust manifolding and passing through the intake manifold directly beneath the carburetor induction passages, the intake and exhaust manifolding being constructed of high thermal inertia slow heat transfer material, the improvement comprising, the crossover passage being defined by a thin walled sheet metal tube of high heat transfer potential for quickly radiating and transferring the heat of exhaust gases flowing through the tube through the tube walls in all directions to the fuel in the air/fuel mixture adjacent and contiguous to the tube, the tube having a flattened midportion of a generally rectangular-like cross section providing major and minor axes and being spaced from the walls of the intake manifold so as to be encompassed by the air/fuel mixture for maximum heat transfer therebetween, the tube extending laterally to a width comparable to the diameter of an induction passage to constitute a splash shield for the vaporization of liquid fuel and fuel vapor coming into contact therewith, the tube having bell mouth-like shaped end sections mating with essentially annular exhaust manifolding portions, the end sections converging towards the flattened tube midportion for spreading the exhaust gas flow laterally of the tube longitudinal axis for better heat transfer through the tube walls.

2. A fuel vaporizer as in claim 1, the tube being longitudinally corrugated to provide a greater effective heat transfer surface.

3. A fuel vaporizer as in claim 1, the tube having at least the upper portion thereof of a dished shape in longitudinal cross-section for containment and subsequent vaporization of liquid fuel coming into contact with the upper portion thereof.

4. A fuel vaporizer as in claim 1, the tube having concave longitudinal and end cross-sections for the puddling of liquid fuel deposited on the tube upper surface adjacent the liner.

5. A fuel vaporizer as in claim 1, the tube having pinched portions formed therein providing thermal expansion and contraction portions.

6. A fuel vaporizer as in claim 1, the liner comprising a removable tubular insert having an annular lip at its upper end seating against the intake manifold.

* * * * *